United States Patent [19]

Cleverly et al.

[11] Patent Number: 5,426,665
[45] Date of Patent: Jun. 20, 1995

[54] SIGNAL COMPRESSION SYSTEMS

[75] Inventors: Colin A. Cleverly, Salisbury; Terence Bayes, Romsey, both of England

[73] Assignee: Roke Manor Research Limited, Romsey, England

[21] Appl. No.: 204,129

[22] Filed: Mar. 2, 1994

[30] Foreign Application Priority Data

May 7, 1993 [GB] United Kingdom ............... 9309470

[51] Int. Cl.[6] .............................................. H04K 1/10
[52] U.S. Cl. ........................................ 375/200; 380/34
[58] Field of Search .................. 375/1; 380/34, 46, 49

[56] References Cited

U.S. PATENT DOCUMENTS 4,601,005  7/1986  Kilvington ........................ 375/1
5,216,691  6/1993  Kaufmann ...................... 380/34
5,271,034  12/1993  Abaunza ......................... 375/1

Primary Examiner—David C. Cain
Attorney, Agent, or Firm—Keck, Mahin & Cate

[57] ABSTRACT

A signal compression system a receiver comprising, a down frequency converter to which received compressed signals are fed thereby to provide compressed baseband signals and an m-bit digital correlator defined by the serial combination of n similar smaller correlator stages, each of k-bits, where nk=m, and a Fast Fourier Transform (FFT) processor having n input ports fed from the n similar smaller correlators stages, one to each port, thereby to provide n output signals from the FFT processor which are fed to signal selector means which serves to select that output signal from the FFT processor which has the largest amplitude thereby to provide a decompressed signal.

4 Claims, 2 Drawing Sheets

SIGNAL COMPRESSION SYSTEMS

This invention relates to signal compression systems. More especially, but not exclusively, it relates to signal compression systems such as spread spectrum communication systems.

In known signal compression systems such as spread spectrum communication systems or radar pulse compression systems, data for transmission is mixed with a pseudo random code and then up frequency converted for radio transmission. In a receiver, the process is reversed, i.e. a received signal is first down converted and then decorrelated to extract the data.

It is essential that the up conversion and the down conversion mixing processes use the same local oscillator frequency, especially when large spreading codes are used, since relatively small frequency differences between the receiver local oscillator and the transmitter local oscillator have the effect of significantly reducing the amplitude of output signals from the decorrelator in the receiver, as will hereinafter be explained in some detail.

In view of the need to reduce this frequency differential as much as possible, up conversion and down conversion local oscillators must be highly accurate and stable, but with currently available oscillators the accuracy/stability requirement is difficult if not impossible to meet without incurring an unacceptable cost penalty, which is clearly a potentially serious problem. One possibility for overcoming this problem is to provide a plurality of receivers tuned to adjacent frequency slots which are centred about a nominal channel frequency and which in combination have a total bandwidth sufficient to cover a worst case frequency drift situation. This solution, however, has the serious disadvantage that it requires a large amount of hardware which is excessively expensive.

It is an object of the present invention therefore to overcome the foregoing problem.

According to the present invention in a signal compression system a receiver comprises, a down frequency converter to which received compressed signals are fed thereby to provide compressed baseband signals and an m-bit digital correlator defined by the serial combination of n similar smaller correlator stages, each of k-bits, where nk=m, and a freqency domain transform processor having n input ports fed from the n similar smaller correlators stages, one to each port, thereby to provide n output signals from the said processor which are fed to signal selector means which serves to select that output signal from the said processor which has the largest amplitude thereby to provide a decompressed signal.

The frequency domain tranform processor may be a Fast Fourier Transform (FFT) processor but it will be appreciated that other frequency domain tranform processors may alternatively be used, such as a maximum entropy analysis processor or a discrete frequency transform processor.

The receiver may be arranged to have phase quadrature related I and Q channels which are decorrelated thereby to produce I and Q output signals using a reference signal which is common to both channels.

The receiver may form a part of a spread spectrum communication system which includes at least one transmitter, which transmitter serves to transmit spread spectrum signals which are received by the receiver and down frequency converted to provide the said baseband signals.

One embodiment of the invention will now be described by way of example only, with reference to the accompanying drawings in which.

Figure 1:
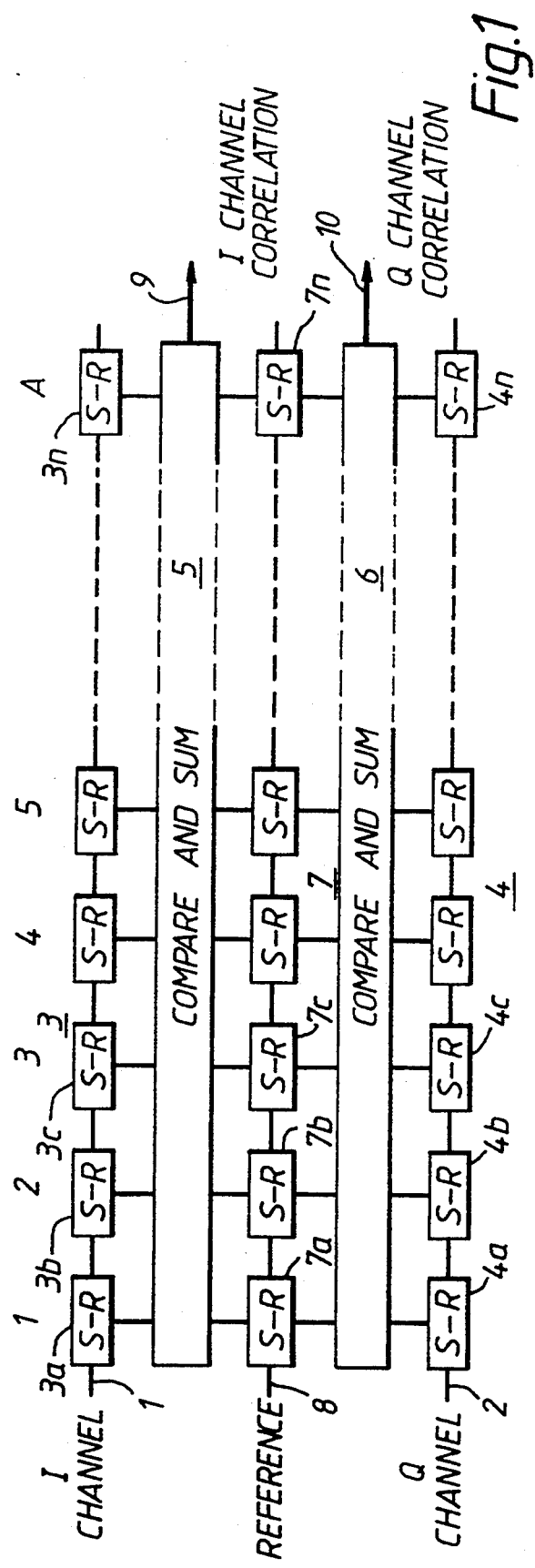
FIG. 1 is a somewhat schematic block diagram of a known digital correlator.

Referring now to FIG. 1, a wideband digital correlator comprises I and Q channel input lines 1 and 2 respectively. The I and Q channels are arranged to feed stores 3 and 4. The store 3 comprises a plurality of serially coupled shift registers 3a, 3b, 3c etc. and the store 4 similarly comprises a plurality of serially coupled shift register elements 4a, 4b, 4c etc. I and Q signals of a channel to be de-spread are stepped through the shift registers of the stores 3 and 4 and compared in comparator/summers 5 and 6 respectively, with a reference signal corresponding to the spreading code which is stored in shift register 7a, 7b, 7c etc. of a reference store 7, which is loaded with code information via an input line 8. Digital correlators of this kind are well known and will not be described herein in detail except to say that when correspondence obtains between the stored reference and the channel signal, a correlator channel signal output will appear on I and Q output lines 9 and 10 respectively.

Figure 2:
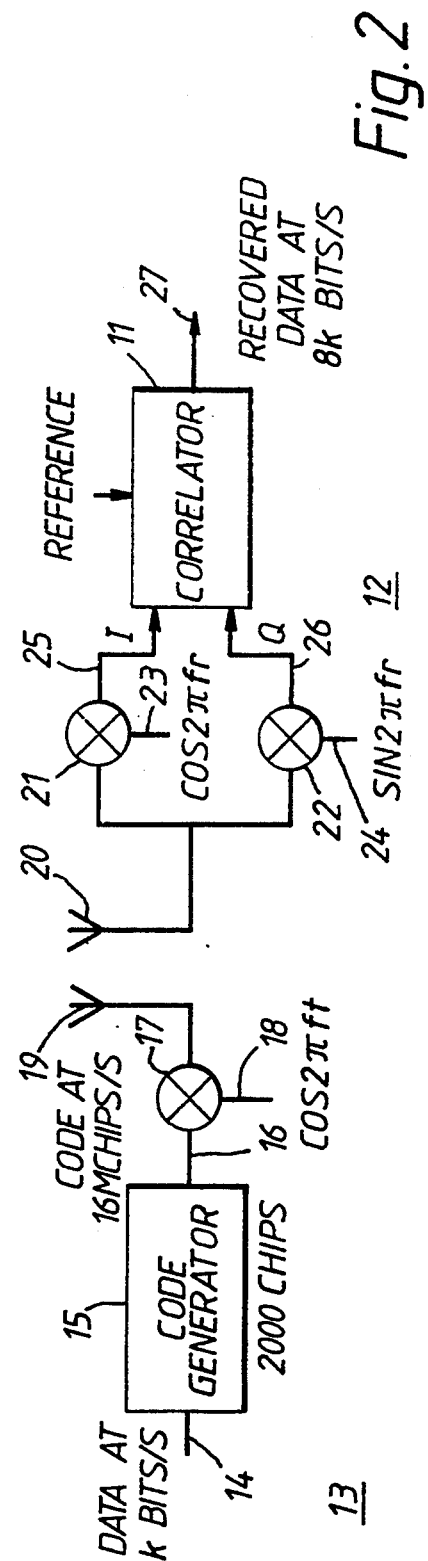
FIG. 2 is a simplified block diagram of a known spread spectrum transmitter and receiver.

As shown in FIG. 2, a correlator 11 which corresponds to the digital correlator just before described with reference to FIG. 1, forms a part of a receiver 12 in known arrangements wherein the receiver 12 is arranged to receive spread spectrum signals from a transmitter 13. In this example, in the transmitter 13, data at 8 kbits/s is fed on an input line 14 to a code generator 15 arranged to generate a 2000 chip pseudo random code, thereby to provide an output signal on a line 16 of 16M chip/s. The signal on the line 16 is fed to a mixer 17 which is fed also with a reference signal on a line 18 at a frequency $f_t$. The frequency $f_t$ thus serves as a carrier frequency which is radiated from an aerial 18 modulated by the 16M chip signal produced by the mixer 17.

At the receiver 12 the signal is received by an aerial 20 and fed to a pair of mixers 21 and 22 which are fed with phase quadrature related local oscillator signals via lines 23 and 24 respectively, so as to produce I and Q output signals at baseband on lines 25 and 26 respectively. The I and Q signals on the lines 25 and 26 are fed to the correlator 11 which operates as just before described with reference to FIG. 1 to produce data output signals on a line 27 at 8 kbits/s.

Figure 3:
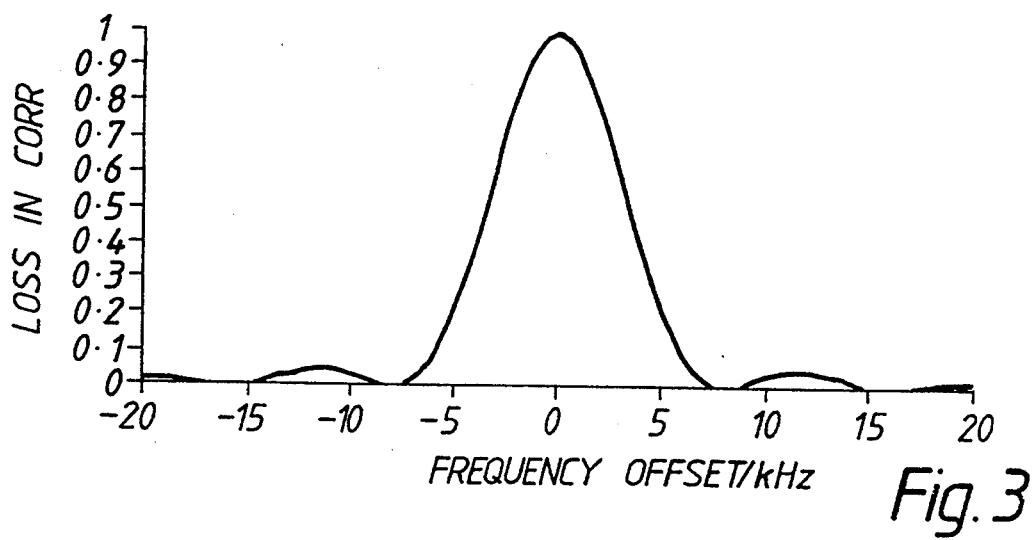
FIG. 3 is a graph of frequency selectivity showing loss in magnitude of correlator output with frequency offset.

The system as shown in FIG. 3 works perfectly well provided the local oscillator signal fr applied to lines 23 and 24 in the receiver 12 corresponds precisely in frequency with the local oscillator signal $f_t$ applied to the mixer 17 in the transmitter 13.

If, however, the receiver frequency $f_r$ is not equal to $f_t$ then the output from the down conversion process contains a residual frequency offset $\partial f$, where $\partial f = f_r - f_t$.

Note that it is the frequency difference that is important, not the absolute values of $f_t$ and $f_r$. The amplitude of the correlator output (found by forming $I^2+Q^2$) is reduced by the frequency offset. The loss is of the form $$\frac{1}{m^2}\left(\frac{\sin(m\pi \partial f T_c)}{\sin(\pi \partial f T_c)}\right)^2,$$

where m is the code length and $T_c$ is the chip period and the potential significance of this loss can be appreciated from FIG. 3.

Thus, as shown in FIG. 3, if the frequency offset $\partial f$ is 8 kHz, the correlation output will be reduced substantially to zero. If the transmitter frequency is 1.6 GHz, the offset of 8 kHz corresponds to a frequency error of only 5 parts per million (ppm). For a usable output from the correlator the maximum allowable offset could be about ±6 kHz (3.75 ppm). The problem is magnified if the code length is increased, or a higher carrier frequency used (since the absolute offset will increase for a given error in ppm).

Figure 4:
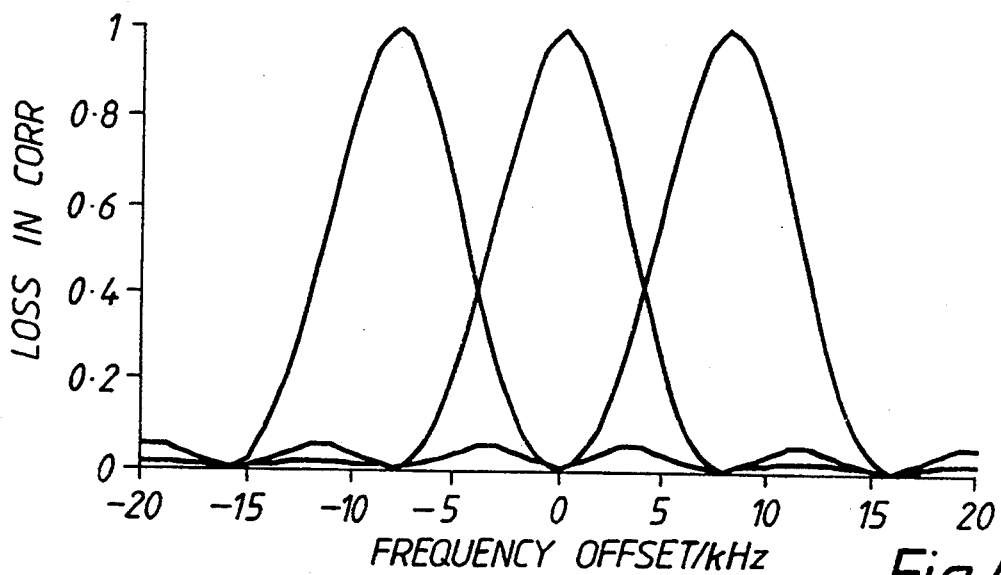
FIG. 4 is a waveform diagram showing loss in magnitude of correlator output with frequency offset using three offset receivers.

One method of obviating the problem is to use a number of parallel receivers, each tuned to a slightly different frequency. For example three receivers could be used with offsets of +8 kHz and −8 kHz. The tolerance to frequency offset is increased as shown in FIG. 4, that is the output will appear in one of the three receivers provided the error is no more than about ±14 kHz.

The disadvantage with using parallel receivers, however, is the enormous increase in hardware required to provide an acceptable performance for a realistic frequency stability.

An arrangement for overcoming the problem will now be described with reference to FIG. 5.

Figure 5:
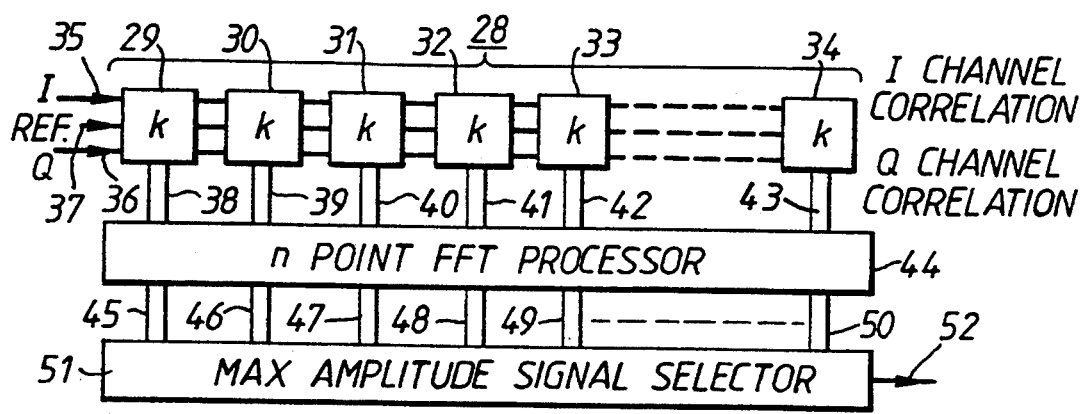
FIG. 5 is a block schematic diagram of a wideband correlator for use in a system according to the present invention.

Referring now to FIG. 5, a wideband correlator comprises a multi-stage correlator 28 which comprises n correlator stages 29, 30, 31, 32, 33 and 34 etc., each k bits in length whereby the correlator 28 is an m bit correlator, wherein m=kn. The correlator stages 29 to 34 etc. are fed with I and Q signals on lines 35 and 36 and with a reference signal on a line 37. Output signals from the correlator stages 29 to 34 etc. are fed on lines 38 to 43 etc. to an n point Fast Fourier Transform (FFT) processor 44. Corresponding output signals are fed from the processor 44 via lines 45 to 50 to a maximum amplitude signal selection unit 51 from which an output signal on a line 52 is provided.

Thus, the n bit correlator 28 is constructed from n smaller correlators 29 to 34, each of length k where m equals n times k. It is useful that in practice manufacturers tend to produce relatively short length correlators and so the multi-stage correlator lends itself to fabrication using a number of readily available shorter devices. Thus, it will be appreciated that division into sub-correlations is not a disadvantage. Each length k correlator has an in-phase and a quadrature phase element corresponding to the arrangement shown in FIG. 1, which produces a partial correlation of the length m code in complex, (real and imaginary) format. To apply frequency correction it is possible to rotate the phase of each partial correlation in a known manner, and sum the results to form an approximation to the correlation over the length of the code. This can be done for a number of frequencies to produce a wide bandwidth correlator requiring only as many partial correlators as would be required for a single full length correlator. The method used herein for combining the partial correlations to produce a wideband correlator is to use a frequency domain transform technique which is carried out by the FFT processor 44. The bandwidth of the correlator is thus increased by the factor n, in the present example. In this example, the 2000 chip correlator would be fabricated with 16 correlator stages each of length 125 chips. A 16 point FFT would be used so as to provide a frequency coverage of ±64 kHz or 40 ppm. To achieve this with parallel receivers would require a minimum of 16 receivers, or 256 correlator devices which is clearly excessively burdensome in terms of hardware requirements. Thus, a significant benefit of the arrangement described with reference to FIG. 5, is the hardware economy it affords, especially when providing a wide bandwidth using very long codes, and/or large frequency offsets.

It will be appreciated of course that the correlator, shown in FIG. 5, can quite simply be used in an arrangement as described with reference to FIG. 2, instead of the correlator 11, whereby a larger differential between $f_t$, the local oscillator applied to the mixer 17, and $f_r$ the local oscillator applied to the mixer 24, can be tolerated whilst still providing a useful output signal on the line 52 as shown in FIG. 5, which corresponds to the line 27 as shown in FIG. 2.

Various modifications may be made to the arrangement described herein without departing from the scope of the invention, and for example, although a 2000 chip correlator has been hereinbefore described by way of example, it will be appreciated that various alternative correlator sizes could be used in accordance with the chosen spreading code.

We claim:

1. In a signal compression system, a receiver comprising, a down frequency converter to which received compressed signals are fed thereby to provide compressed baseband signals, an m-bit digital correlator defined by the serial combination of n similar smaller correlator stages, each of k-bits, where nk=m, and a frequency domain transform processor having n input ports fed from the n similar smaller correlators stages, one to each port, thereby to provide n output signals from the said processor which are fed to signal selector means which serves to select that output signal from the said processor which has the largest amplitude thereby to provide a decompressed signal.

2. A system as claimed in claim 1, wherein the said processor is a Fast Fourier Transform (FFT) processor.

3. A system as claimed in claim 1, wherein the receiver is arranged to have phase quadrature related I and Q channels which are decorrelated thereby to produce I and Q output signals using a reference signal which is common to both channels.

4. A system as claimed in claim 1, wherein the receiver forms a part of a spread spectrum communication system which includes at least one transmitter, which transmitter serves to transmit spread spectrum signals which are received by the receiver and down frequency converted to provide the said baseband signals.

* * * * *